July 8, 1958     E. J. HOLDEMAN     2,842,388
RAILROAD COMPRESSED AIR HOSE GASKET Filed Feb. 3, 1956

INVENTOR.
EUGENE J. HOLDEMAN
BY
McMorrow, Berman + Davidson
ATTORNEYS

United States Patent Office 2,842,388
Patented July 8, 1958

2,842,388

RAILROAD COMPRESSED AIR HOSE GASKET

Eugene J. Holdeman, Freeport, Ill.

Application February 3, 1956, Serial No. 563,313

1 Claim. (Cl. 288—23)

This invention relates to gaskets for the air hose coupling heads of railroad cars, and more particularly has reference to an improved, double-sealing gasket specifically designed for use in coupling heads of this type.

When the air hoses of railroad cars are joined during coupling of the cars, it is important that air leakage at the location of the coupling be reduced to a complete minimum. However, heretofore this has not been possible, due to the conventional design of gasket employed in the coupling heads.

Due to the difficulties which have heretofore existed, the active head of compressed air loses pressure as a result of gasket leaks, and this is particularly true on long trains. A conventional gasket has its sealing face so formed as to be disposed in a single plane and this has been found to prevent the establishment of a full seal in the coupling head.

In view of the above, it is proposed to provide a gasket the sealing face of which has an inner surface in a plane slightly below the plane of the outer surface, with the gasket being reduced in thickness at the juncture of said surfaces, so as to provide, in a single, integrally formed gasket, concentric inner and outer rings providing a double bond that will be substantially tighter than that now accomplished through the use of conventional gaskets.

A further object of importance is to provide a gasket as described which will be particularly designed to reduce wear on the gasket, thus prolonging the intervals between gasket replacements.

Another object is to provide a gasket which will be particularly designed to effect a tight seal even though the gasket may become stiff and lose resiliency due to freezing weather.

Yet another object is to provide a gasket of the type referred to which will be fully interchangeable with conventional types, thus to permit use of the gasket in conventional coupling heads without modification or redesign of said heads, except to be fitted to the coupling.

Other objects will appear from the following description, the claim appended thereto, and from the annexed drawing, in which like reference characters designate like parts throughout the several views, and wherein:

Figure 1:
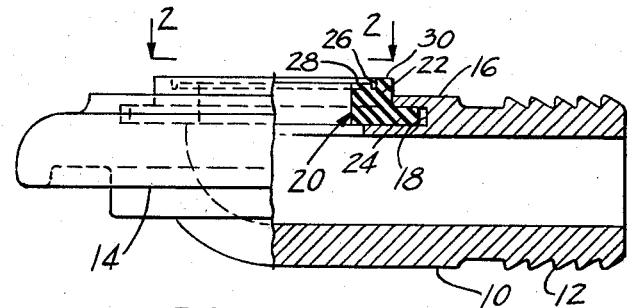
Figure 1 is a view of a coupling head partly in elevation and partly in longitudinal section, equipped with a gasket formed according to the present invention, said gasket being shown partly in elevation and partly in section.
Figure 2:
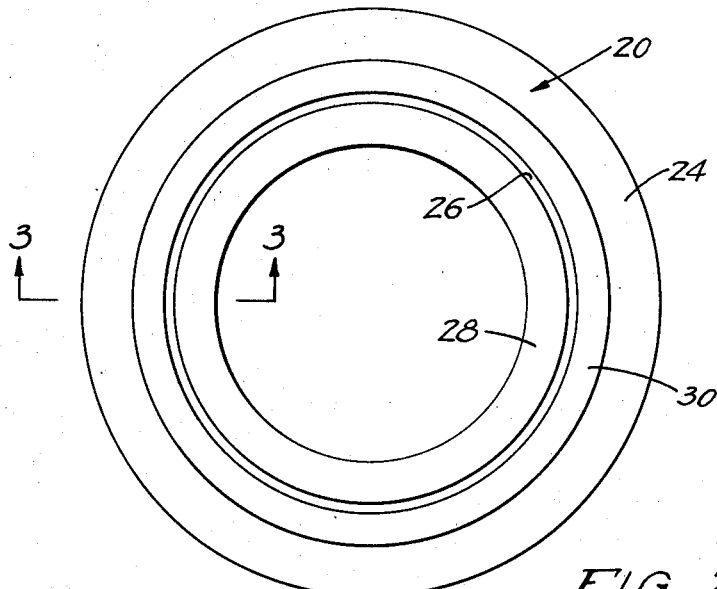
Figure 2 is an enlarged top plan view of the gasket per se.

Referring to the drawings in detail, the reference numeral 10 designates a conventional railroad car air hose coupling head, having at one end a tubular extension 12 externally ribbed or toothed in the usual manner. At the other end of the coupling head there is provided a circular portion 14 having a flat top surface 16 apertured to provide communication with the bore of the head. The center opening of the top portion of the coupling head has a continuous, inwardly facing recess 18.

All this is conventional construction, and does not per se constitute part of the present invention.

The gasket constituting the present invention has been generally designated at 20, and is formed of rubber or of any other sealing material found suitable in providing a desired, leak-preventive bond between the coupling heads of adjacent railroad cars.

The gasket includes a body 22 of annular formation having vertical inner and outer surfaces, said body being integrally formed with an outwardly directed, continuous circumferential flange 24 at the lower end of the body, said flange 24 being adapted to snap into the groove 18 of the coupling head in the usual manner.

Formed in the top surface of the body 22 is an upwardly facing, continuous, annular groove 26, said groove being slightly closer to the outer edge of the gasket body 22 than it is to the inner edge of said gasket body. The groove could be centered between said edges if desired. The groove 26 reduces the thickness of the gasket body at the location of the groove, so that there are provided, in effect, inner and outer coupling rings 28, 30 which, though integrally connected, are possessed of the characteristic of flexibility relative to one another due to the provision of the space or groove 26 therebetween.

Figure 3:
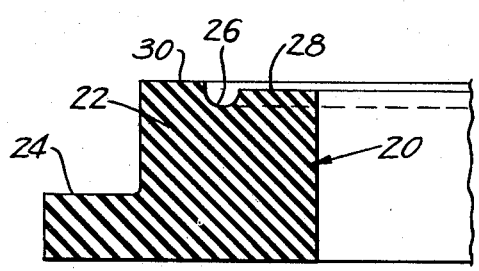
Figure 3 is a sectional view through the gasket, the scale being enlarged above that used in Figure 2.

The inner coupling ring 28 is slightly wider than the ring 30, due to the location of the groove as described above, and the ring 28 has its top surface in a plane slightly below the plane of the top surface of the ring 30 as shown to particular advantage in Figure 3. The planes are parallel, and are normal to the axis of the annular gasket body.

Due to the construction illustrated and described, there are defined two compression rings with a space between them designed to increase flexibility of the rings relative to one another. The top surface of the inner ring is at the same level as the top surface of conventional gaskets heretofore employed, thus to permit interchangeability of the new gasket with old type gaskets. Further, the arrangement provides a double sealing bond, due to the different planes of the top surfaces of the inner and outer rings.

The disposition of the top surface of the outer ring in a slightly higher plane than the top surface of the inner ring is for two main reasons. The first of these is to make a second and tighter bond, when the coupling heads are joined together, than has heretofore been the case. The second reason for the construction is to reduce wear on the inner ring and thus permit gasket replacement to be effected less frequently than has heretofore been true, with the gasket nevertheless providing a full seal even though it may be stiff from freezing weather.

Due to the construction illustrated and described, the active head of compressed air will travel further and faster on long trains without loss of pressure from gasket leaks. There will thus result a higher amount of compressed air, available for the brakes on the rear ends of long trains, than has heretofore been true.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A gasket for railroad car air hose coupling heads comprising an annular body of resiliently compressible material solidly formed and approximately square when viewed in cross section at any location on its circumference, a continuous, outwardly directed mounting flange formed on the outer periphery of the body, the top surface of the body being formed with a continuous, annular groove the width of which is approximately equal to the maximum depth thereof, said groove lying intermediate the outer and inner peripheries of the body to reduce the thickness of the body at the location of the groove, thereby to define outer and inner coupling rings separated by the groove and flexible relative to one another through the provision of the groove, the width of the groove being substantially less than the distance between each side edge of the groove and the corresponding adjacent edge of the gasket body measured along a line extending radially of the gasket body, the outer ring having a top surface in a plane slightly above that of the top surface of the inner ring, said planes being parallel and being disposed normally to the axis of the body.

References Cited in the file of this patent

UNITED STATES PATENTS

| | | |
|---|---|---|
| 612,394 | Bernardi | Oct. 18, 1898 |
| 857,106 | Pendergast | June 18, 1907 |
| 922,347 | Sheafe | May 18, 1909 |
| 1,910,706 | Malzard | May 23, 1933 |
| 2,439,923 | Clark | Apr. 20, 1948 |